United States Patent [19]

Dorfman

[11] 4,070,742
[45] Jan. 31, 1978

[54] MOTORIZED ROLLING PIN
[76] Inventor: Claire Dorfman, 2251 Faunce St., Philadelphia, Pa. 19152
[21] Appl. No.: 750,329
[22] Filed: Dec. 13, 1976
[51] Int. Cl.² .............................................. B05C 1/08
[52] U.S. Cl. .................................................. 29/110.5
[58] Field of Search ............... 29/110.5, 115; 425/374, 425/363, 367; 69/20

[56] References Cited
U.S. PATENT DOCUMENTS

| | | | |
|---|---|---|---|
| 681,050 | 8/1901 | Freschl | 425/374 X |
| 932,322 | 8/1909 | Pozsonyi | 425/374 |
| 2,827,659 | 3/1958 | Rabun | 425/374 X |
| 3,753,638 | 8/1973 | Simpson | 425/374 X |
| 4,013,166 | 3/1977 | Weady et al. | 29/115 X |

FOREIGN PATENT DOCUMENTS 731,902  6/1932  France .................................... 69/20

Primary Examiner—Alfred R. Guest
Attorney, Agent, or Firm—J. Rodman Steele, Jr.

[57] ABSTRACT

A hand-held motorized rolling pin for sheeting dough and other similarly pliable materials. In one embodiment, the motor and the motor controls are situated inside of a handle which is detachable with respect to a cylindrical roller member. A second handle is permanently and rotatably connected to the opposite side of the cylindrical roller member. The motorized rolling pin of this embodiment receives its power through an a-c power cord or from a rechargeable battery also mounted inside of the detachable handle. In a second embodiment, the motor, the motor controls and a rechargeable battery are mounted inside of the cylindrical roller member. A socket for a detachable cord for charging the battery is provided on one of the non-operational flat sides of the cylindrical roller member. Switch means are mounted through the central axis of one of the two permanently fixed but rotatable handles. The motorized rolling pins of both embodiments are further provided with replaceable textured sleeves which are slidable over the cylindrical roller member. The sleeves provide means for texturing different consistency doughs or other pliable materials and facilitate cleaning of the device.

9 Claims, 9 Drawing Figures

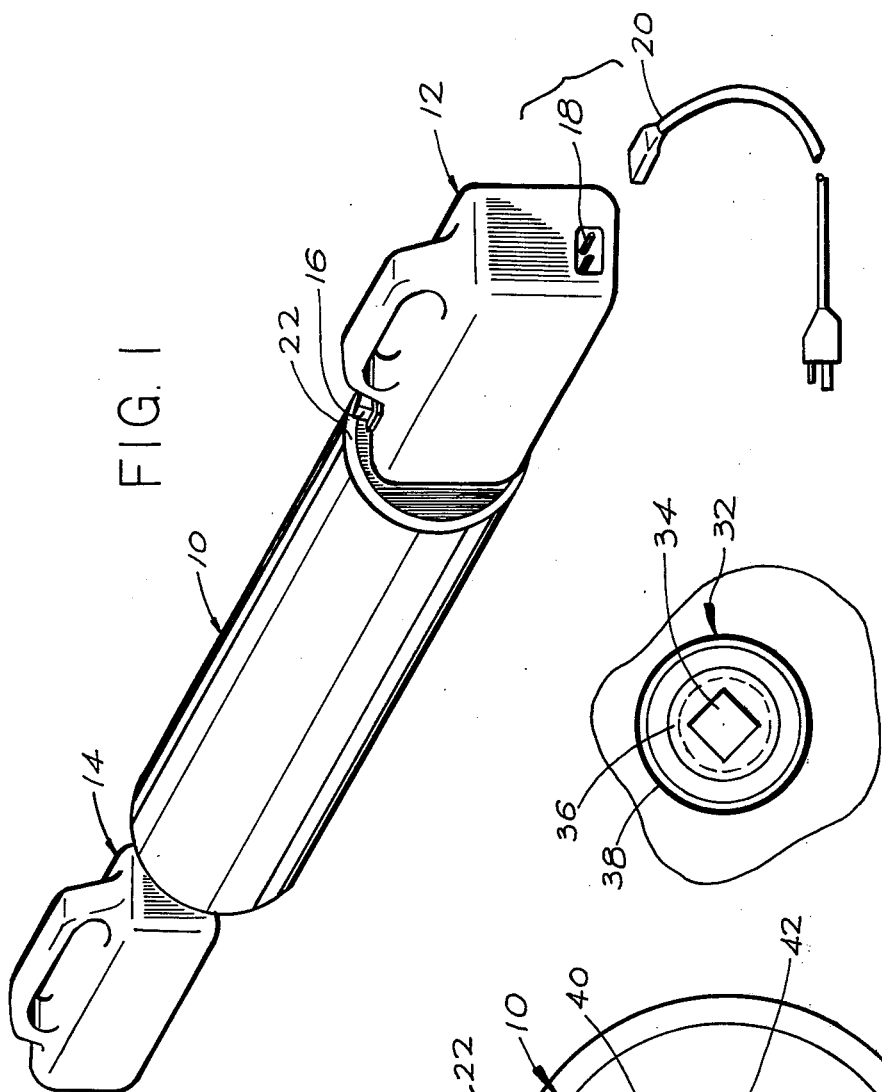
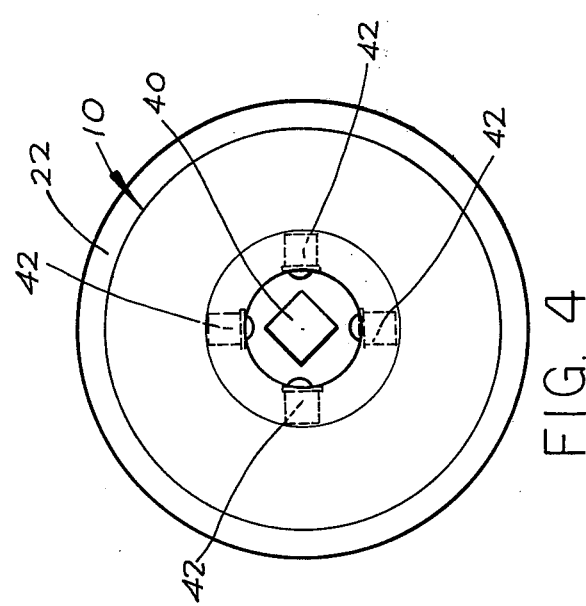

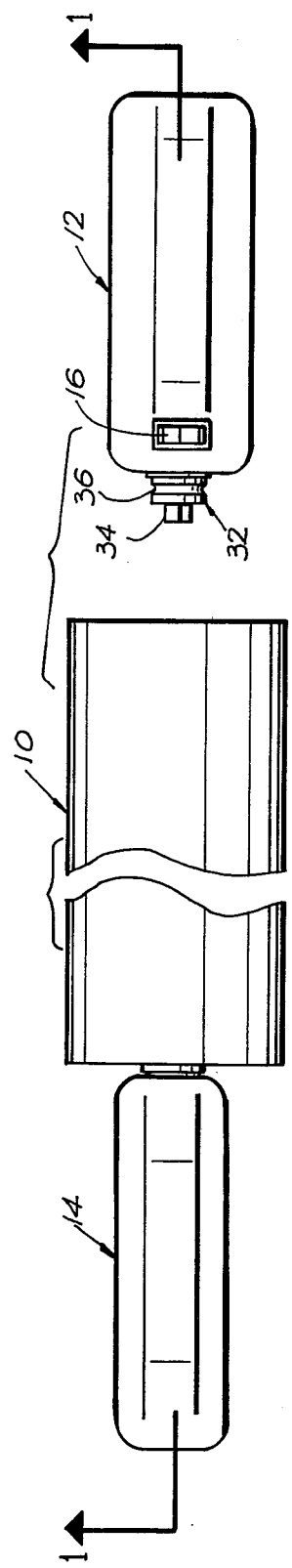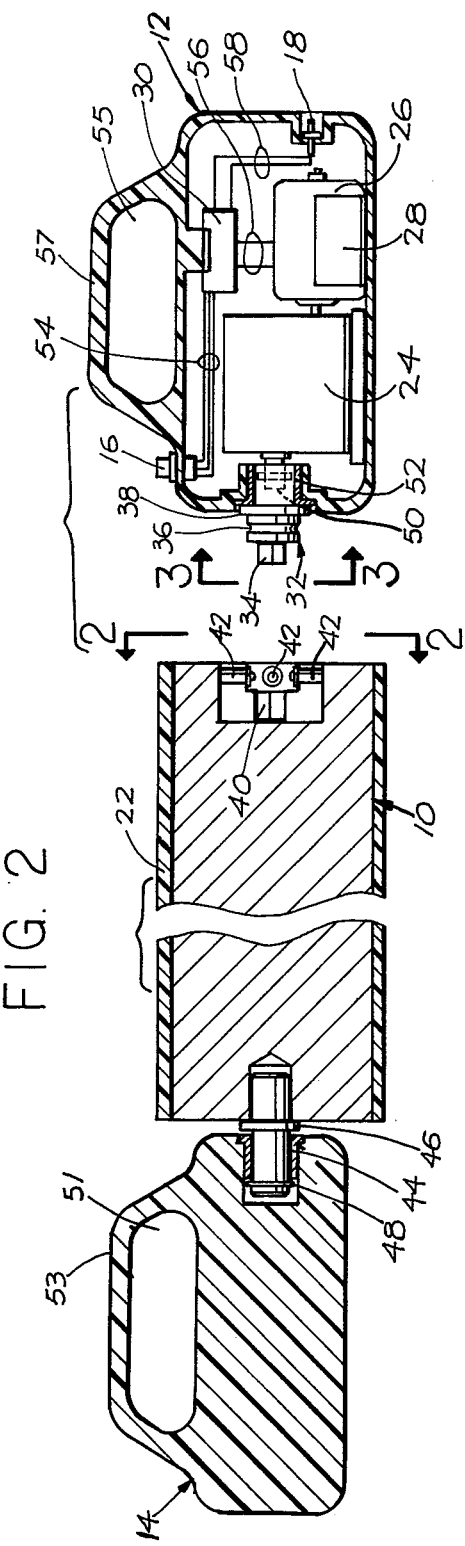

MOTORIZED ROLLING PIN

BACKGROUND OF THE INVENTION

In the field of sheeting dough, there have been several devices employing motorized or otherwise mechanical rollers in place of the ordinary rolling pin. However, virtually all of these devices have been used on an industrial scale. Further, none of these apparatus are suitable for rolling out, for example, one round pie crust. The primary reason is that even though some of the roller mechanisms are height adjustable (to gradually reduce the dough to the desired thickness) they are constructed so as to be operated back and forth along only one line of movement.

Such operationally limited devices are disclosed in U.S. Pat. No. 932,322 - Pozsonyi and U.S. Pat. No. 3,753,638 - Simpson.

A device for texturing chopped meat is disclosed in U.S. Pat. No. 2,827,659 - Rabun. It is also operationally limited in that it can produce sheets of chopped meat of only one thickness, and the resulting sheets are rectangular in shape. If round meat patties are desired, they must be so cut out of the sheet.

The present invention accords the greatest amount of flexibility in obtaining a sheet of dough or other pliable material of any desired thickness or shape because it is hand-held. The spinning motion of the roller obviates the need for the user to apply extra or excess force in thinning the dough, such as would be provided in the spring-lever arrangement of Pozsonyi or the pulleys of Simpson. This is particularly helpful for certain handicapped, elderly or otherwise infirm people who are incapable of applying the physical force otherwise necessary for sheeting dough.

The cordless embodiment of the present invention is particularly convenient for working in confined spaces or under conditions where a-c power is not easily accessible, such as trailers, boats or on-site locations where pliable industrial materials must be sheeted for use.

BRIEF DESCRIPTION OF THE INVENTION

It is an object of the present invention to provide a handheld motorized device for sheeting dough or other pliable material.

It is another object of the present invention to provide a hand-held device for sheeting dough or other pliable materials which obviates the need for applying flattening force to said dough or other material.

It is a still further object of the present invention to provide a device for sheeting dough or other pliable material which can impart different textures and patterns to said material.

It is yet another object of the present invention to provide a device for sheeting dough or other pliable material which can be moved back and forth in an unlimited number of directions.

It is yet another object of the present invention to provide an electrically motorized, hand-held rolling pin for sheeting dough, which rolling pin flattens said dough by reason of its motorized rotational movement, obviating the need for applying flattening pressure to said dough.

It is yet another object of the present invention to provide a self-contained, cordless, electrically motorized hand-held rolling pin for sheeting dough or other pliable material.

Briefly, a device according to the present invention has a cylindrical roller member, a handle which is permanently but rotatably attached to one end of the roller member and a power handle which is detachably and rotatably connected to the roller member. The roller member may be fitted with a plurality of interchangeable sleeves, which may be slid on to and off of the roller member when the power handle is detached. The power handle has mounted therein an electrical motor, a gear-type, step-down transmission and switch means for controlling the motor. The power handle receives electric energy through its detachable a-c power cord. The transmission, which is driven by the motor, drives a roller driving member, having a stud with a square cross-section and a wider section with a groove therein. When the power handle is attached to the roller member, the stud engages a correspondingly square stud hole in the roller member, so that rotational energy from the roller drive member may be imparted to the roller member. The groove of the roller driver member is detachably engaged by four spring-loaded, locking-ball indents, mounted around the periphery beyond the stud hole.

In another embodiment according to the present invention, all of the roller member driving components are mounted inside of a hollow, cylindrical roller member. Plastic journal bearings are used to rotatably connect two handles, one to each end of the roller member. An electric motor is mounted inside of the roller member, with the shaft of the motor and both handles aligned along the central axis of the roller member. The shaft of the electric motor is connected to one handle. A rechargeable battery is also mounted inside the roller member, which battery powers the electric motor. Battery charge control means, including indicator lamps which warn that the device is plugged in to an a-c source and being charged and that the device is charged are also mounted in the roller member. Switch means are mounted through the central axis of the handle not connected to the electric motor. These switch means engage a push-action switch mounted inside the roller member which turns the motor on and off. The push button switch may be the kind of switch which turns on only when depressed, or may be the kind of switch which turns on and off alternately each time it is depressed. In the presently preferred form of this embodiment, the push button switch is of the latter type. The motorized rolling pin of this embodiment is also provided with removeable, textured sleeves which may be slipped onto and off of the roller member, both to facilitate cleaning and to apply any desired texture to the material being sheeted. If both handles are grasped firmly, one in each hand, the roller member will rotate when the switch means are actuated. If the switch is actuated when the whole assembly is lying on a table, or if the whole assembly is placed on a table without first turning off the motor, the handle attached to the motor will spin harmlessly until the unit is deactivated.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a perspective view according to the present invention with handle-mounted driving means;

FIG. 2 is a top view according to the present invention with handle-mounted driving means;
FIG. 3 is a view of section 1—1 of FIG. 2;
FIG. 4 is a view of section 2—2 of FIG. 3;
FIG. 5 is a view of section 3—3 of FIG. 3.

DETAILED DESCRIPTION OF PREFERRED EMBODIMENTS

Figure 6:
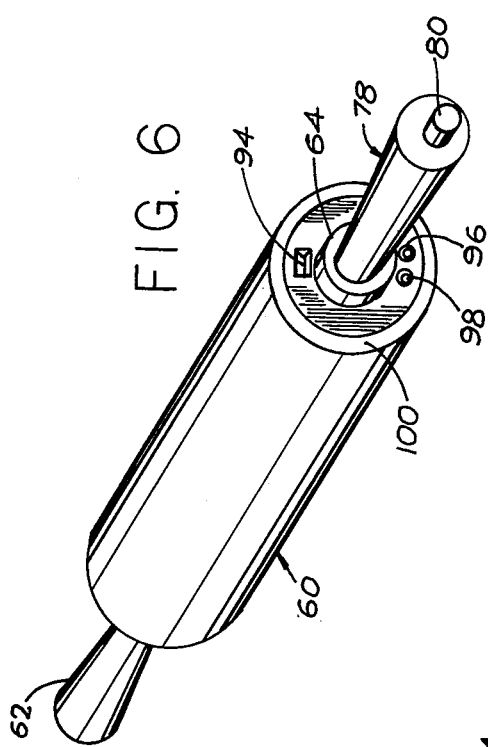
FIG. 6 is a perspective view according to the present invention with driving means mounted inside the cylindrical roller member.
Figure 9:
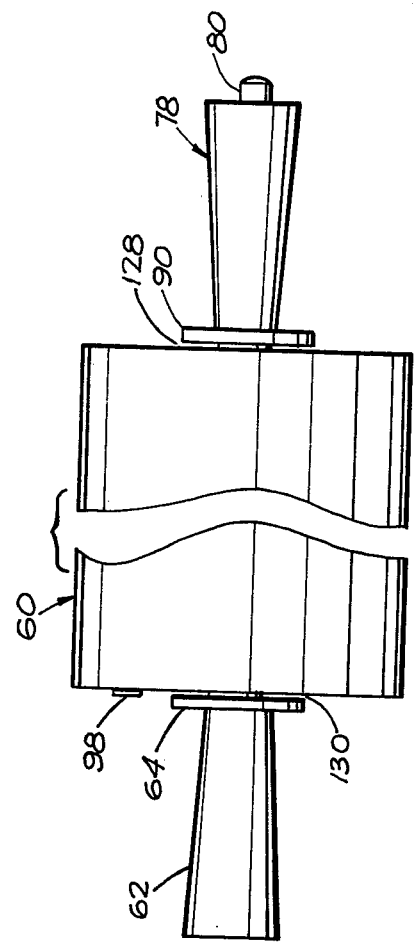
FIG. 9 is a side view of FIG. 6.

With reference to FIG. 1, there is disclosed a motorized rolling pin, having a cylindrical roller member 10, a handle 14 which is permanently but rotatably attached to one end of the roller member 10, and a power handle 12, which is detachably, rotatably and drivably connected to the roller member 10. The roller member 10 may be fitted with a plurality of interchangeable sleeves 22, which may be slid onto and off of the roller member 10 when the power handle 12 is detached. The power handle 12 receives electric energy through a-c power cord 20, which is detachably connectable to socket 18.

With further reference to FIGS. 2 and 3, the power handle 12 has mounted therein an electric motor 26 on motor mount 28. The motor 26 is connected to the input of a gear-type, step-down transmission 24. The output shaft 50 of the transmission 24 is connected to roller driving member 32 and is secured thereto by locking pin 52. The roller driving member 32 is further connected to the power handle 12 by the plastic journal bearing 38. Roller driving member 32 has a stud 34, with square cross-section, and a wider section with groove 36 therein as detailed in FIG. 5. When the power handle 12 is attached to the roller member 10, the stud 34 engages the stud hole 40, so that rotational energy from the roller driving member 32 may be imparted to the roller member 10. The groove 36 is detachably engaged by the four spring-loaded, locking-ball indents 42, mounted around the periphery beyond stud hole 40, as detailed in FIG. 4.

The power handle 12 is further provided with an on-off-reverse rocker switch 16, which engages only when depressed, turning itself off when released. The socket 18 is connected to the motor control means 30 through supply wires 58. The rocker switch 16 is connected to the motor control means 30 through switch wires 54. The motor control means 30 are connected to the motor 26 through motor wires 56. The motor control means 30 cause the motor 26 to spin in either direction, in response to the position of rocker switch 16.

The plastic journal bearing 44 is press-fitted into handle 14. Plastic handle shaft 46 is connected through the plastic journal 44, and rotatably secured thereto by C-ring 48. The portion of the plastic handle shaft 46 outside of handle 14 is press-fitted into roller member 10.

The unit is operated in the following manner. The power cord 20 is first attached to socket 18 on power handle 12 and then plugged into standard a-c outlet (not shown). The power handle 12 and handle 14 may be grasped by slipping the fingers of each hand through the slots 51 and 55 formed by upper rails 53 and 57. The power handle 12 should be grasped so that the thumb of the hand holding power handle 12 is adjacent rocker switch 16. By flipping rocker switch 16, the user turns on the motor 16. The motor 26 drives the transmission 24, which in turn drives the roller driving member 32. The roller driving member 32 drives the roller member 10 through the stud 42 and stud hole 40. If the user wishes to reverse the direction of rotation of the roller in conjunction with the direction of rolling, this may be easily accomplished through use of rocker switch 16. When the sheeting process has been completed, power handle 12 may be easily detached from roller member 10 by pulling them apart with only that force necessary to overcome the spring force of the locking-ball indents 42. When the power handle 12 has been detached, sleeve 22 may be slipped off roller member 10 for easy cleaning thereof.

It will be obvious to those skilled-in-the-art that other means are available for detachably and rotatably connecting power handle 12 to roller member 10 in such a way that rotational energy may be imparted from power handle 12 to roller member 10. It will also be clear to those skilled-in-the-art that there are other means available for permanently but rotatably connecting handle 14 to roller member 10. It will also be clear that handle 14 may also be detachably as well as rotatably connected to roller member 10. It should be clearly understood that the present invention is not restricted to the particular means set forth herein.

Figure 7:
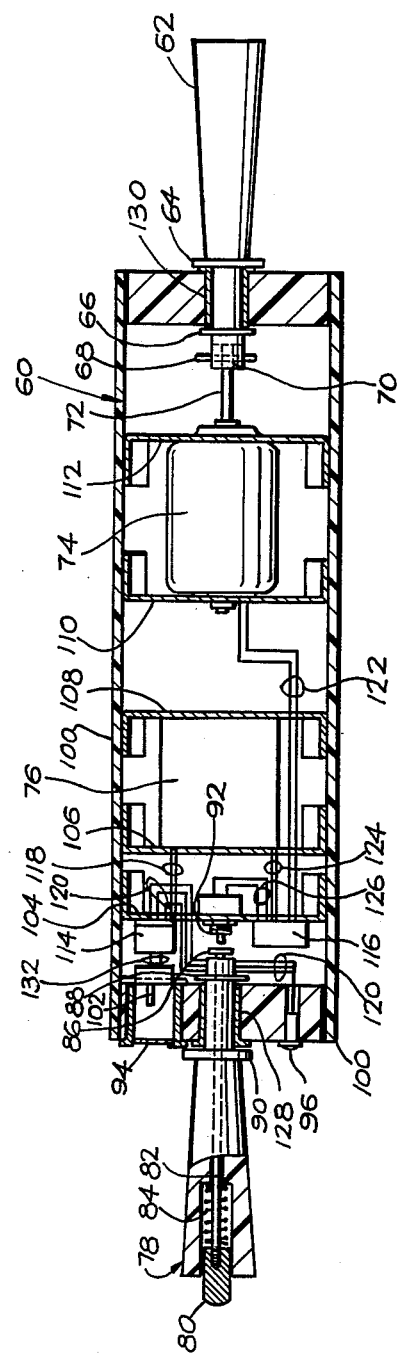
FIG. 7 is an edge view of FIG. 6.

Another embodiment of the present invention is disclosed in FIGS. 6 through 9. In this embodiment, all of the driving components are mounted inside of a hollow, cylindrical roller member 60. With reference to FIG. 7, the inner sleeve 64 of a plastic journal bearing is secured to the end of handle 62. The outer sleeve 130 of the plastic journal bearing is press-fitted through one end of the hollow cylindrical roller member 60. The inner sleeve 64 is slipped into the outer sleeve 130 and retained therein by C-ring 66. The handle 62 is thereby permanently but rotatably connected to the roller member 60. Likewise, handle 78 has connected to the end thereof inner sleeve 90 of a second plastic journal bearing. The outer sleeve 28 of the second plastic journal is connected to the other end of the hollow cylindrical roller member 60. An electric motor 74 is mounted inside of roller member 60 by means of motor frames 110 and 112. The handle 62, the handle 78 and the electric motor 74 are mounted such that both handles 62 and 78 and the motor shaft 72 of the electric motor 74 are aligned along the central axis of the cylindrical roller member 60. The inside portion of handle 62 has a locking pin slot 70 which is engaged by handle locking pin 68, which is itself connected to the end of the motor shaft 72.

Figure 8:
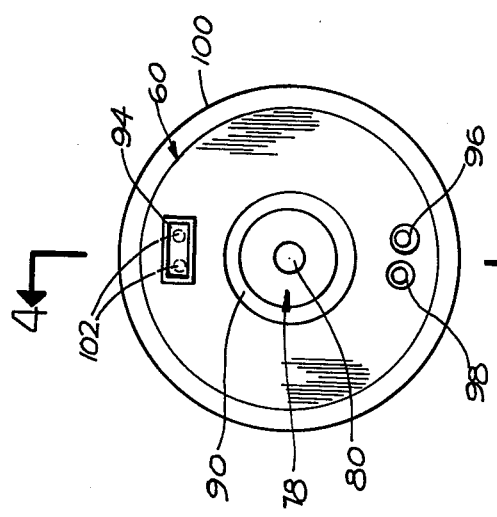
FIG. 8 is a view of section 4—4 of FIG. 7.

A rechargeable electric battery 76 is mounted inside the hollow cylindrical roller member 60 on battery frames 106 and 108. A socket 102 may be connected to an a-c power cord (not shown) similar to power cord 20 of FIG. 1. The socket is covered by socket cover 94, which may be spring loaded to close automatically by known means not shown. Supply wires 132 connect socket 102 to the battery charge control means 114. Charging wires 118 connect the battery charge control means 114 to the rechargeable battery 76. The battery charge control means 114 are also connected to two indicator lamps, 96 and 98, as shown in FIG. 8, by lamp wires 120. Lamps 96 and 98 may be wheat grain bulbs, light emitting diodes or other similar indicator lights. Lamp 96 may be a red lamp, which indicates that the device is connected to an a-c power source (not shown) and the rechargeable battery 76 is being charged. Lamp 98 may be a green light, which indicates when the rechargeable battery 76 has been fully charged, so that it may be disconnected from the a-c power source (not shown). The output of the rechargeable battery 76 is connected by battery wires 124 to the switch control means 116. The switch control means 116 is connected to switch 92 by switch wires 126 and to the electric motor 74 by motor wires 122. The battery charge control means 114, the switch 92 and switch control means 116 are mounted on switch frame 104.

A switch actuating rod 82 is slideably connected axially through the center of handle 78. The switch actuating rod 82 terminates at one end with button 80 and at the other end with rod retainer 86. A spring 84 urges button 80 out of handle 78, and rod retainer 86 retains the switch actuating rod 82 and button 80 in handle 78. A push-action switch 92 is engageable by rod retainer 86 when button 80 is manually depressed. Push-action switch 92 may be the kind of switch which turns on only when depressed, or may be the kind of switch which turns on and off alternately, each time it is depressed. In the presently preferred form of this embodiment, push-action switch 92 is of the latter type.

The motorized rolling pin of this embodiment is also provided with removable, textured sleeves 100, which may be slipped onto and off of roller member 60, both to facilitate cleaning and to apply any desired texture to the material being sheeted.

In use, the handles 62 and 78 are grasped firmly, one in each hand. When button 80 is depressed, actuating the push-action switch 92, the roller member 60 will rotate about handles 62 and 78. If push-action switch 92 is actuated when the whole assembly is lying on a table, or if the whole assembly is placed on a table without first turning off the electric motor 74, handle 62 will spin harmlessly, until the unit is deactivated.

It will be clear to those skilled-in-the-art that other means are available for rotatably connecting handles 62 and 78 to roller member 60 and for actuating push-action switch 92. It will also be clear to those skilled-in-the-art that power handle 12 of the first preferred embodiment may also be fitted with a rechargeable battery and need not necessarily rely on a transmission to transmit rotational energy from the motor 26 to the roller driving member 32. It is to be clearly understood that the present invention is not limited to those means set forth herein.

In view of the above, the present invention may be embodied in other specific forms without departing from the spirit or essential attributes thereof, and, accordingly, reference should be made to the appended claims, rather than to the foregoing specification as indicating the scope of the invention.

I claim:
1. A motorized rolling pin, comprising:
   a cylindrical roller member, having a longitudinal central axis;
   a first handle, rotatably connected to one end of said roller member, disposed along and rotatable about said central axis;
   a second handle rotatably connected to the end of said roller member opposite from said first handle, disposed along and rotatable about said central axis;
   means mounted exclusively in said first handle for imparting rotatational energy to said roller member to spin said roller member about said central axis, between said first and said second handles; and,
   means for controlling said rotational energy imparting means.
2. The motorized rolling pin of claim 1, wherein said control means comprise:
   a switch-actuating rod, mounted through the center of said second handle along said central axis, protruding from the end of said second handle and extending inside said roller member;
   a push-action switch mounted inside said roller member, operatively engageable by said switch-actuating rod, when said switch-actuating rod is manually pushed into said roller member; and
   means mounted in said second handle for urging said switch-actuating rod outwardly from said roller member.
3. The motorized rolling pin of claim 1, further comprising:
   a roller driving member rotatably connected to said first handle and driven by said rotational energy imparting means; and
   means for detachably and drivably connecting said roller driving member to said roller member, thereby causing said roller member to rotate about said central axis when said rotational energy imparting means is activated.
4. The motorized rolling pin of claim 3, wherein said rotational energy imparting means comprise:
   a motor mounted inside of said first handle; and
   means for transmitting rotational energy from said motor to said roller driving member.
5. The motorized rolling pin of claim 4 further comprising
   a battery mounted inside said first handle, for supplying power to said motor.
6. The motorized rolling pin of claim 5 wherein said battery is a rechargeable battery and further comprising:
   regulating means mounted inside said roller member for charging said rechargeable battery.
7. The motorized rolling pin of claim 4, wherein said transmitting means is a gear-type, step-down transmission.
8. The motorized rolling pin of claim 4, wherein said control means include an on-off-reverse switch connected to said motor and mounted on top of said first handle.
9. The motorized rolling pin of claim 3, further comprising a textured sleeve which is slideably and detachably connected to said roller member.

* * * * *